United States Patent
Nagakura et al.

(10) Patent No.: US 11,794,078 B2
(45) Date of Patent: Oct. 24, 2023

(54) GOLF BALL

(71) Applicant: Sumitomo Rubber Industries, Ltd., Kobe (JP)

(72) Inventors: Hikaru Nagakura, Kobe (JP); Kazuyoshi Shiga, Kobe (JP); Kai Hayashi, Kobe (JP); Takahiro Shigemitsu, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 4 days.

(21) Appl. No.: 17/520,864

(22) Filed: Nov. 8, 2021

(65) Prior Publication Data

US 2022/0193494 A1    Jun. 23, 2022

(30) Foreign Application Priority Data

Dec. 22, 2020 (JP) .................. 2020-212988

(51) Int. Cl.
*A63B 37/06* (2006.01)
*A63B 37/00* (2006.01)
*C08L 9/00* (2006.01)

(52) U.S. Cl.
CPC ...... *A63B 37/0051* (2013.01); *A63B 37/0063* (2013.01); *A63B 37/0065* (2013.01); *A63B 37/0074* (2013.01); *C08L 9/00* (2013.01); *C08L 2207/53* (2013.01); *C08L 2312/00* (2013.01)

(58) Field of Classification Search
CPC .............. A63B 37/005; A63B 37/0051; A63B 37/0062; A63B 37/0063
USPC ......................................... 473/351
See application file for complete search history.

(56) References Cited

U.S. PATENT DOCUMENTS

| | | | |
|---|---|---|---|
| 7,410,429 B1 | 8/2008 | Bulpett et al. | |
| 7,429,221 B1 * | 9/2008 | Bulpett .............. | A63B 37/0064 473/376 |
| 2011/0028246 A1 * | 2/2011 | Kimura ................. | C08K 5/098 473/383 |
| 2015/0224367 A1 | 8/2015 | Comeau et al. | |

FOREIGN PATENT DOCUMENTS

| | | |
|---|---|---|
| JP | 2004-121815 A | 4/2004 |
| JP | 2009-34518 A | 2/2009 |
| JP | 2009-34519 A | 2/2009 |
| JP | 2011-31038 A | 2/2011 |
| JP | 2015-154927 A | 8/2015 |

* cited by examiner

*Primary Examiner* — Raeann Gorden
(74) *Attorney, Agent, or Firm* — Birch, Stewart, Kolasch & Birch, LLP

(57) ABSTRACT

An object of the present invention is to provide a golf ball having excellent shot feeling while maintaining the resilience performance on driver shots. The present invention provides a golf ball comprising a core and at least one cover covering the core, wherein the core is formed from a core rubber composition containing (a) a base rubber, (b) an α,β-unsaturated carboxylic acid having 3 to 8 carbon atoms and/or a metal salt thereof as a co-crosslinking agent, (c) a crosslinking initiator, and (d) a monophenol compound having a substituent group only at p-position.

19 Claims, 1 Drawing Sheet

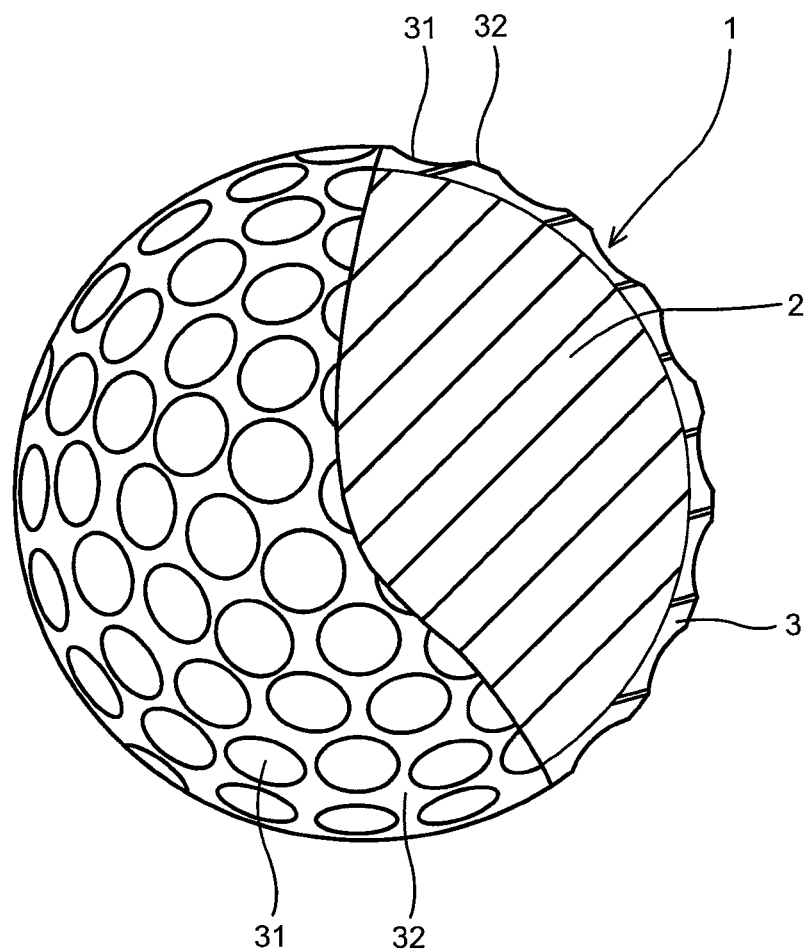

GOLF BALL

FIELD OF THE INVENTION

The present invention relates to a golf ball, more specifically relates to a technology for improving a core of a golf ball.

DESCRIPTION OF THE RELATED ART

As a material for forming a core of a golf ball, a rubber composition containing a base rubber, a co-crosslinking agent and a crosslinking initiator is widely used in view of its good resilience.

For example, JP 2004-121815 A discloses a golf ball having a heat-molded product of a rubber composition as a constituent element, wherein the rubber composition contains a polybutadiene including a cis-1,4 bond in an amount of 60 wt % or more and having a Mooney viscosity ($ML_{1+4}$ (100° C.)) of 40 or more, an unsaturated carboxylic acid and/or a metal salt thereof, an organic peroxide, and a monophenol-based antioxidant.

JP 2011-31038 A discloses a golf ball comprising a core formed by vulcanizing a rubber composition, and a cover composed primarily of a polyurethane material, wherein the rubber composition of the core contains 100 parts by mass of a base rubber, 10 to 40 parts by mass of an unsaturated carboxylic acid or a metal salt thereof, a peroxyketal and a monophenol-based antioxidant, and a mixing ratio (a)/(b) of the peroxyketal (a) to the monophenol-based antioxidant (b) ranges from 5 to 50 in a mass ratio.

JP 2009-034518 A, JP 2009-034519 A and JP 2015-154927 A disclose antioxidants such as 2-t-butyl-4-methoxyphenol, 3-t-butyl-4-methoxyphenol, 3-t-octyl-4-methoxyphenol, 2-methyl-4-methoxyphenol, 2,5-di-t-butyl-4-methoxyphenol, and 2-methyl-4-methoxyphenol to provide the core with a negative hardness distribution.

SUMMARY OF THE INVENTION

The higher resilience of a core of a golf ball gives the greater flight distance on driver shots. However, there is a problem that the core having high resilience is hard, and thus the shot feeling on driver shots is poor.

An object of the present invention is to provide a golf ball travelling a great flight distance and having excellent shot feeling on driver shots by improving the core.

The present invention provides a golf ball comprising a core and at least one cover layer covering the core, wherein the core is formed from a core rubber composition containing (a) a base rubber, (b) an α,β-unsaturated carboxylic acid having 3 to 8 carbon atoms and/or a metal salt thereof as a co-crosslinking agent, (c) a crosslinking initiator, and (d) a monophenol compound having a substituent group only at p-position.

In the present invention, adding (d) the monophenol compound having the substituent group only at p-position in the core rubber composition allows the core to have a constant hardness in the vicinity of the core surface while allowing the core to have an outer-hard and inner-soft hardness distribution. As a result, the golf ball according to the present invention travels a great flight distance and has good shot feeling on driver shots.

The reason why the hardness distribution of the core in the present invention is controlled is not clear, but it is considered as follows. In the crosslinking step of the core rubber composition, the radical generated by the cleavage of (c) the crosslinking initiator extracts hydrogen from (a) the base rubber to generate the graft starting point for (b) the co-crosslinking agent, and polymerizing and crosslinking start from the graft starting point. It is considered that (d) the monophenol compound having the substituent group only at p-position used in the present invention expresses an effect of functioning as a polymerization inhibitor or radical scavenger. If the core rubber composition used in the present invention contains (d) the monophenol compound having the substituent group only at p-position, the radical involved in the crosslinking reaction happening in the vicinity of the core surface is particularly stabilized. As a result, the crosslinking reaction hardly proceeds in the vicinity of the core surface, and the hardness in the vicinity of the core surface does not increase and becomes constant.

According to the present invention, a golf ball traveling a great flight distance and having excellent shot feeling on driver shots is obtained.

BRIEF DESCRIPTION OF THE DRAWINGS

The FIGURE is a partially cutaway cross-sectional view of a golf ball according to one embodiment of the present invention.

DESCRIPTION OF THE PREFERRED EMBODIMENT

The present invention provides a golf ball comprising a core and at least one cover layer covering the core, wherein the core is formed from a core rubber composition containing (a) a base rubber, (b) an α,β-unsaturated carboxylic acid having 3 to 8 carbon atoms and/or a metal salt thereof as a co-crosslinking agent, (c) a crosslinking initiator, and (d) a monophenol compound having a substituent group only at p-position.

[(a) Base Rubber]

As (a) the base rubber, a natural rubber and/or a synthetic rubber can be used. As (a) the base rubber, for example, a polybutadiene rubber, a natural rubber, a polyisoprene rubber, a styrene-butadiene rubber, or an ethylene-propylene-diene rubber (EPDM) can be used. These rubbers may be used solely, or at least two of these rubbers may be used in combination. Among them, typically preferred is a high cis-polybutadiene having a cis-1,4 bond in an amount of 40 mass % or more, preferably 80 mass % or more, more preferably 90 mass % or more, and even more preferably 95 mass % or more in view of its superior resilience.

From the viewpoint of obtaining a core having higher resilience, the amount of the high-cis polybutadiene in the base rubber is preferably 60 mass % or more, more preferably 80 mass % or more, and even more preferably 90 mass % or more. It is also preferable that (a) the base rubber consists of the high-cis polybutadiene.

The high-cis polybutadiene preferably has a 1,2-vinyl bond in an amount of 2.0 mass % or less, more preferably 1.7 mass % or less, and even more preferably 1.5 mass % or less. This is because if the amount of the 1,2-vinyl bond is excessively high, the resilience may be lowered.

The high-cis polybutadiene is preferably one synthesized using a rare-earth element catalyst. When a neodymium catalyst employing a neodymium compound which is a lanthanum series rare-earth element compound, is used, a polybutadiene rubber having a high amount of the cis-1,4 bond and a low amount of the 1,2-vinyl bond is obtained with an excellent polymerization activity, and thus such polybutadiene rubber is particularly preferable.

The high-cis polybutadiene preferably has a Mooney viscosity ($ML_{1+4}$ (100° C.)) of 30 or more, more preferably 32 or more, and even more preferably 35 or more, and preferably has a Mooney viscosity ($ML_{1+4}$ (100° C.)) of 140 or less, more preferably 120 or less, even more preferably 100 or less, and most preferably 55 or less. It is noted that the Mooney viscosity ($ML_{1+4}$ (100° C.)) in the present invention is a value measured according to JIS K6300 using an L rotor under the conditions of preheating time: 1 minute, rotor rotation time: 4 minutes, and temperature: 100° C.

The high-cis polybutadiene preferably has a molecular weight distribution Mw/Mn (Mw: weight average molecular weight, Mn: number average molecular weight) of 2.0 or more, more preferably 2.2 or more, even more preferably 2.4 or more, and most preferably 2.6 or more, and preferably has a molecular weight distribution Mw/Mn of 6.0 or less, more preferably 5.0 or less, even more preferably 4.0 or less, and most preferably 3.0 or less. If the molecular weight distribution (Mw/Mn) of the high-cis polybutadiene is excessively low, the processability may deteriorate, and if the molecular weight distribution (Mw/Mn) of the high-cis polybutadiene is excessively high, the resilience may be lowered. It is noted that the molecular weight distribution is measured by gel permeation chromatography ("HLC-8120GPC" available from Tosoh Corporation) using a differential refractometer as a detector under the conditions of column: GMHHXL (available from Tosoh Corporation), column temperature: 40° C., and mobile phase: tetrahydrofuran, and calculated by converting based on polystyrene standard.

[(b) Co-Crosslinking Agent]

(b) The α,β-unsaturated carboxylic acid having 3 to 8 carbon atoms and/or the metal salt thereof used in the core rubber composition is blended as a co-crosslinking agent in the rubber composition, and has an action of crosslinking a rubber molecule by graft polymerization to a base rubber molecular chain.

Examples of the α,β-unsaturated carboxylic acid having 3 to 8 carbon atoms include acrylic acid, methacrylic acid, fumaric acid, maleic acid, and crotonic acid.

Examples of the metal constituting the metal salt of the α,β-unsaturated carboxylic acid having 3 to 8 carbon atoms include a monovalent metal ion such as sodium, potassium, and lithium; a divalent metal ion such as magnesium, calcium, zinc, barium, and cadmium; a trivalent metal ion such as aluminum; and other metal ions such as tin, and zirconium. The metal component may be used solely or as a mixture of at least two of them. Among them, as the metal component, the divalent metal such as magnesium, calcium, zinc, barium, and cadmium is preferable. This is because use of the divalent metal salt of the α,β-unsaturated carboxylic acid having 3 to 8 carbon atoms easily generates a metal crosslinking between the rubber molecules. Especially, as the divalent metal salt, zinc acrylate is preferable, because zinc acrylate enhances the resilience of the resultant golf ball. It is noted that the α,β-unsaturated carboxylic acid having 3 to 8 carbon atoms and/or the metal salt thereof may be used solely or in combination of at least two of them.

The amount of (b) the α,β-unsaturated carboxylic acid having 3 to 8 carbon atoms and/or the metal salt thereof is preferably 15 parts by mass or more, more preferably 20 parts by mass or more, and even more preferably 25 parts by mass or more, and is preferably 50 parts by mass or less, more preferably 45 parts by mass or less, and even more preferably 35 parts by mass or less, with respect to 100 parts by mass of (a) the base rubber. If the amount of (b) the α,β-unsaturated carboxylic acid having 3 to 8 carbon atoms and/or the metal salt thereof is less than 15 parts by mass, the amount of (c) the crosslinking initiator which will be explained later must be increased in order to obtain an appropriate hardness of the core formed from the core rubber composition, which tends to lower the resilience of the obtained golf ball. On the other hand, if the amount of the α,β-unsaturated carboxylic acid having 3 to 8 carbon atoms and/or the metal salt thereof is more than 50 parts by mass, the core formed from the core rubber composition becomes so hard that the shot feeling of the obtained golf ball may be lowered.

[(c) Crosslinking Initiator]

(c) The crosslinking initiator used in the core rubber composition is blended in order to crosslink (a) the base rubber component. As (c) the crosslinking initiator, an organic peroxide is preferable. Specific examples of the organic peroxide include an organic peroxide such as dicumyl peroxide, 1,1-bis(t-butylperoxy)-3,3,5-trimethylcyclohexane, 2,5-dimethyl-2,5-di(t-butylperoxy)hexane, and di-t-butylperoxide. These organic peroxides may be used solely or in combination of at least two of them. Among them, dicumyl peroxide is preferably used.

The amount of (c) the crosslinking initiator is preferably 0.2 part by mass or more, more preferably 0.5 part by mass or more, and even more preferably 0.7 part by mass or more, and is preferably 5.0 parts by mass or less, more preferably 2.5 parts by mass or less, and even more preferably 2.0 parts by mass or less, with respect to 100 parts by mass of (a) the base rubber. If the amount of the crosslinking initiator is less than 0.2 part by mass, the core formed from the core rubber composition becomes so soft that the resilience of the obtained golf ball may be lowered. If the amount of (c) the crosslinking initiator is more than 5.0 parts by mass, the amount of (b) the co-crosslinking agent which has been explained above must be decreased in order to obtain an appropriate hardness of the core formed from the core rubber composition, which may lower the resilience of the obtained golf ball or worsen the durability of the obtained golf ball.

[(d) Monophenol Compound Having a Substituent Group Only at p-Position]

(d) The monophenol compound having the substituent group only at the p-position is a compound having a substituent group only at p-position of a monophenol. The monophenol compound having the substituent group only at the p-position is a compound having a substituent group directly bonding at p-position to the single hydroxy group of the phenol, and having no substituent group at o-position and m-position to the hydroxy group. Examples of the substituent group at p-position include an alkoxy group, a halogen group, a hydrocarbon group, a nitro group, a cyano group, an amino group and a hydroxy group, and the alkoxy group is preferable.

(d) The monophenol compound having the substituent group only at the p-position is preferably a compound represented by the following general formula (1).

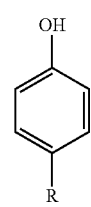

(1)

[In the general formula (1), R represents an alkoxy group, a halogen group, a hydrocarbon group, a nitro group, a cyano group, an amino group, or a hydroxy group.

Examples of the alkoxy group include a group having an oxygen atom bonding to an alkyl group having 1 or more carbon atoms. The alkoxy group is not particularly limited, as long as the alkoxy group has 1 or more carbon atoms, and the alkoxy group preferably has 1 to 20 carbon atoms, more preferably has 1 to 10 carbon atoms, and even more preferably has 1 to 8 carbon atoms. The alkyl moiety of the alkoxy group may be linear, branched or cyclic. Specific examples of the alkyl moiety of the alkoxy group include a linear or branched alkyl group such as a methyl group, an ethyl group, a n-propyl group, an isopropyl group, a n-butyl group, an isobutyl group, a sec-butyl group, a tert-butyl group, a n-pentyl group, an isopentyl group, a sec-pentyl group, a tert-pentyl group, a neopentyl group, a n-hexyl group, an isohexyl group, a sec-hexyl group, a tert-hexyl group, a n-heptyl group, an isoheptyl group, a sec-heptyl group, a tert-heptyl group, a n-octyl group, an isooctyl group, a sec-octyl group, and a tert-octyl group; and a cyclic alkyl group such as a cyclobutyl group, a cyclopentyl group, a cyclohexyl group, a cycloheptyl group, and a cyclooctyl group. Specific examples of the alkoxy group include a methoxy group, an ethoxy group, a propoxy group (including n-, iso-structure), a butoxy group (including n-, iso-, sec-, tert-, cyclo-structure), a pentyloxy group (including n-, iso-, sec-, tert-, cyclo-structure), a hexyloxy group (including n-, iso-, sec-, tert-, cyclo-structure), a heptyloxy group (including n-, iso-, sec-, tert-, cyclo-structure), and an octyloxy group (including n-, iso-, sec-, tert-, cyclo-structure). It is noted that the alkoxy group may have a substituent group (e.g. halogen group, hydroxy group, amino group, nitro group, and cyano group).

Examples of the halogen group include a fluoro group, a chloro group, a bromo group, and an iodo group.

Examples of the hydrocarbon group include an alkyl group, an alkenyl group, an alkynyl group, an aralkyl group, and an aryl group.

The alkyl group is not particularly limited, as long as the alkyl group has 1 or more carbon atoms, and the alkyl group preferably has 1 to 20 carbon atoms, more preferably has 1 to 10 carbon atoms, and even more preferably has 1 to 8 carbon atoms. The alkyl group may be linear, branched or cyclic, and specific examples thereof include a linear or branched alkyl group such as a methyl group, an ethyl group, a n-propyl group, an isopropyl group, a n-butyl group, an isobutyl group, a sec-butyl group, a tert-butyl group, a n-pentyl group, an isopentyl group, a sec-pentyl group, a tert-pentyl group, a neopentyl group, a n-hexyl group, an isohexyl group, a sec-hexyl group, a tert-hexyl group, a n-heptyl group, an isoheptyl group, a sec-heptyl group, a tert-heptyl group, a n-octyl group, an isooctyl group, a sec-octyl group, and a tert-octyl group; and a cyclic alkyl group such as a cyclobutyl group, a cyclopentyl group, a cyclohexyl group, a cycloheptyl group, and a cyclooctyl group. It is noted that the alkyl group may have a substituent group (e.g. a halogen group, a hydroxy group, an amino group, a nitro group, and a cyano group).

The alkenyl group is not particularly limited, as long as the alkenyl group has 2 or more carbon atoms. The alkenyl group preferably has 2 to 20 carbon atoms, more preferably has 2 to 10 carbon atoms, and even more preferably has 2 to 8 carbon atoms. Specific examples of the alkenyl group include a vinyl group, an allyl group, a propenyl group, an isopropenyl group, a butenyl group, an isobutenyl group, and a hexenyl group. It is noted that the alkenyl group may have a substituent group (e.g. an alkyl group, a halogen group, a hydroxy group, an amino group, a nitro group, a cyano group).

The alkynyl group is not particularly limited, as long as the alkynyl group has 2 or more carbon atoms. The alkynyl group preferably has 2 to 20 carbon atoms, more preferably has 2 to 10 carbon atoms, and even more preferably has 2 to 8 carbon atoms. Specific examples of the alkynyl group include an ethynyl group, a 1-propynyl group, a 2-propynyl group (propargyl group), and a butynyl group. It is noted that the alkynyl group may have a substituent group (e.g. an alkyl group, a halogen group, a hydroxy group, an amino group, a nitro group, a cyano group).

The aralkyl group is not particularly limited, as long as the aralkyl group has 7 or more carbon atoms. The aralkyl group preferably has 7 to 20 carbon atoms, more preferably has 7 to 10 carbon atoms, and even more preferably has 7 to 8 carbon atoms. Specific examples of the aralkyl group include a benzyl group, a phenylethyl group, a phenylbutyl group, and an α-cumyl group. It is noted that the aralkyl group may have a substituent group (e.g. an alkyl group, a halogen group, an amino group, a nitro group, a cyano group).

The aryl group is not particularly limited, as long as the aryl group has 6 or more carbon atoms. The aryl group preferably has 6 to 20 carbon atoms, more preferably has 6 to 15 carbon atoms, and even more preferably has 6 to 10 carbon atoms. Specific examples of the aryl group include a phenyl group, and a naphthyl group. It is noted that the aryl group may have a substituent group (e.g. an alkyl group, a halogen group, an amino group, a nitro group, a cyano group).

In the general formula (1), the substituent group represented by R is preferably the alkoxy group, more preferably the alkoxy group having 1 to 8 carbon atoms, and even more preferably a methoxy group, an ethoxy group, a propoxy group or a butoxy group.

(d) The monophenol compound having the substituent group only at the p-position may be used solely, or two or more of them may be used in combination.

The amount of (d) the monophenol compound having the substituent group only at the p-position is preferably 0.1 part by mass or more, more preferably 0.2 part by mass or more, and even more preferably 0.3 part by mass or more, and is preferably 2.0 parts by mass or less, more preferably 1.8 parts by mass or less, and even more preferably 1.5 parts by mass or less, with respect to 100 parts by mass of (a) the base rubber. If the amount of (d) the monophenol compound having the substituent group only at the p-position is less than 0.1 part by mass, the effect of adding (d) the monophenol compound having the substituent group only at the p-position is little, and if the amount of (d) the monophenol compound having the substituent group only at the p-position is more than 2.0 parts by mass, the core becomes excessively soft. If the core becomes excessively soft, the flight distance on driver shots tends to be lowered.

The mass ratio (component (b)/component (d)) of the component (b) to the component (d) is preferably 18.5 or more, more preferably 20 or more, and even more preferably 25 or more, and is preferably 300 or less, more preferably 150 or less, and even more preferably 100 or less. If the mass ratio (component (b)/component (d)) falls within the above range, the golf ball travels a great flight distance while maintaining the shot feeling.

The mass ratio (component (c)/component (d)) of the component (c) to the component (d) is preferably 0.4 or more, more preferably 0.5 or more, and even more preferably 0.6 or more, and is preferably 10.0 or less, more preferably 6.0 or less, and even more preferably 5.0 or less. If the mass ratio (component (c)/component (d)) falls within the above range, the golf ball travels a great flight distance while maintaining the shot feeling.

[(e) Organic Sulfur Compound]

The core rubber composition preferably further contains (e) an organic sulfur compound. If (e) the organic sulfur compound is contained, the obtained core has higher resilience.

Examples of (e) the organic sulfur compound include at least one compound selected from the group consisting of thiols (thiophenols and thionaphthols), polysulfides, thiazoles, thiurams, thiocarboxylic acids, dithiocarboxylic acids, sulfenamides, and dithiocarbamates.

Examples of the thiols include thiophenols and thionaphthols. Examples of the thiophenols include thiophenol; thiophenols substituted with a fluoro group, such as 4-fluorothiophenol, 2,4-difluorothiophenol, 2,5-difluorothiophenol, 2,6-difluorothiophenol, 2,4,5-trifluorothiophenol, and 2,4,5,6-tetrafluorothiophenol, pentafluorothiophenol; thiophenols substituted with a chloro group, such as 2-chlorothiophenol, 4-chlorothiophenol, 2,4-dichlorothiophenol, 2,5-dichlorothiophenol, 2,6-dichlorothiophenol, 2,4,5-trichlorothiophenol, 2,4,5,6-tetrachlorothiophenol, and pentachlorothiophenol; thiophenols substituted with a bromo group, such as 4-bromothiophenol, 2,4-dibromothiophenol, 2,5-dibromothiophenol, 2,6-dibromothiophenol, 2,4,5-tribromothiophenol, 2,4,5,6-tetrabromothiophenol, and pentabromothiophenol; thiophenols substituted with an iodo group, such as 4-iodothiophenol, 2,4-diiodothiophenol, 2,5-diiodothiophenol, 2,6-diiodothiophenol, 2,4,5-triiodothiophenol, and 2,4,5,6-tetraiodothiophenol, pentaiodothiophenol; and metal salts thereof. As the metal salt, a divalent metal salt is preferable, and a zinc salt is more preferable.

Examples of the thionaphthols (naphthalenethiols) include 2-thionaphthol, 1-thionaphthol, 1-chloro-2-thionaphthol, 2-chloro-1-thionaphthol, 1-bromo-2-thionaphthol, 2-bromo-1-thionaphthol, 1-fluoro-2-thionaphthol, 2-fluoro-1-thionaphthol, 1-cyano-2-thionaphthol, 2-cyano-1-thionaphthol, 1-acetyl-2-thionaphthol, 2-acetyl-1-thionaphthol, and a metal salt thereof. As the metal salt, a divalent metal salt is preferable, and a zinc salt is more preferable.

The polysulfides are organic sulfur compounds having a polysulfide bond, and examples thereof include disulfides, trisulfides, and tetrasulfides. As the polysulfides, diphenylpolysulfides are preferable.

Examples of the diphenylpolysulfides include diphenyldisulfide; diphenyldisulfides substituted with a halogen group, such as bis(4-fluorophenyl)disulfide, bis(2,5-difluorophenyl)disulfide, bis(2,6-difluorophenyl)disulfide, bis(2,4,5-trifluorophenyl)disulfide, bis(2,4,5,6-tetrafluorophenyl)disulfide, bis(pentafluorophenyl)disulfide, bis(4-chlorophenyl)disulfide, bis(2,5-dichlorophenyl)disulfide, bis(2,6-dichlorophenyl)disulfide, bis(2,4,5-trichlorophenyl)disulfide, bis(2,4,5,6-tetrachlorophenyl)disulfide, bis(pentachlorophenyl)disulfide, bis(4-bromophenyl)disulfide, bis(2,5-dibromophenyl)disulfide, bis(2,6-dibromophenyl)disulfide, bis(2,4,5-tribromophenyl)disulfide, bis(2,4,5,6-tetrabromophenyl)disulfide, bis(pentabromophenyl)disulfide, bis(4-iodophenyl)disulfide, bis(2,5-diiodophenyl)disulfide, bis(2,6-diiodophenyl)disulfide, bis(2,4,5-triiodophenyl)disulfide, bis(2,4,5,6-tetraiodophenyl)disulfide, and bis(pentaiodophenyl)disulfide; and diphenyldisulfides substituted with an alkyl group, such as bis(4-methylphenyl)disulfide, bis(2,4,5-trimethylphenyl)disulfide, bis(pentamethylphenyl)disulfide, bis(4-t-butylphenyl)disulfide, bis(2,4,5-tri-t-butylphenyl)disulfide, and bis(penta-t-butylphenyl)disulfide.

Examples of the thiazoles include 2-mercaptobenzothiazole, di-2-benzothiazolyl disulfide, 2-(N,N-diethylthiocarbamoylthio)benzothiazole, 2-(4'-morpholinodithio)benzothiazole, 4-methyl-2-mercaptobenzothiazole, di-(4-methyl-2-benzothiazolyl)disulfide, 5-chloro-2-mercaptobenzothiazole, 2-mercapto-6-nitrobenzothiazole, 2-mercapto-naphtho[1,2-d]thiazole, 2-mercapto-5-methoxybenzothiazole, 6-amino-2-mercaptobenzothiazole, and a metal salt thereof.

Examples of the thiurams include thiuram monosulfides such as tetramethylthiuram monosulfide; thiuram disulfides such as tetramethylthiuram disulfide, tetraethylthiuram disulfide, and tetrabutylthiuram disulfide; and thiuram tetrasulfides such as dipentamethylenethiuram tetrasulfide. Examples of the thiocarboxylic acids include a naphthalene thiocarboxylic acid. Examples of the dithiocarboxylic acids include a naphthalene dithiocarboxylic acid. Examples of the sulfenamides include N-cyclohexyl-2-benzothiazole sulfenamide, N-oxydiethylene-2-benzothiazole sulfenamide, and N-t-butyl-2-benzothiazole sulfenamide.

As (e) the organic sulfur compound, at least one compound selected from the group consisting of the thiophenols substituted with a halogen group, the metal salt of the thiophenols substituted with a halogen group, the diphenyldisulfides substituted with a halogen group, the thiazoles, and the metal salt of the thiazoles, is preferable.

(e) The organic sulfur compound may be used solely or in combination of at least two of them.

The amount of (a) the organic sulfur compound is preferably 0.05 part by mass or more, more preferably 0.1 part by mass or more, and even more preferably 0.2 part by mass or more, and is preferably 5.0 parts by mass or less, more preferably 3.0 parts by mass or less, and even more preferably 2.0 parts by mass or less, with respect to 100 parts by mass of (a) the base rubber. If the amount of (a) the organic sulfur compound is less than 0.05 part by mass, the effect of adding (a) the organic sulfur compound may be little. In addition, if the amount of (a) the organic sulfur compound is more than 5.0 parts by mass, the obtained golf ball may have an excessively large compression deformation amount, and thus the resilience thereof may be lowered.

[(f) Metal Compound]

In the case that the core rubber composition contains only the α,β-unsaturated carboxylic acid having 3 to 8 carbon atoms as the co-crosslinking agent, the core rubber composition preferably further contains (f) a metal compound. This is because neutralizing the α,β-unsaturated carboxylic acid having 3 to 8 carbon atoms with the metal compound in the core rubber composition provides substantially the same effect as using the metal salt of the α,β-unsaturated carboxylic acid having 3 to 8 carbon atoms as the co-crosslinking agent. It is noted that in case of using the α,β-unsaturated carboxylic acid having 3 to 8 carbon atoms and the metal salt thereof in combination as the co-crosslinking agent, (f) the metal compound may be used as an optional component.

(f) The metal compound is not particularly limited, as long as the metal compound neutralizes (b) the α,β-unsaturated carboxylic acid having 3 to 8 carbon atoms in the core rubber composition. Examples of (f) the metal compound include a metal hydroxide such as magnesium hydroxide, zinc hydroxide, calcium hydroxide, sodium hydroxide, lithium hydroxide, potassium hydroxide, and copper hydroxide; a metal oxide such as magnesium oxide, calcium oxide, zinc oxide, and copper oxide; and a metal carbonate such as magnesium carbonate, zinc carbonate, calcium carbonate, sodium carbonate, lithium carbonate, and potassium carbonate. (f) The metal compound is preferably a divalent metal compound, more preferably a zinc compound. This is because the divalent metal compound reacts with the α,β-unsaturated carboxylic acid having 3 to 8 carbon atoms, thereby forming a metal crosslinking. Further, use of the zinc compound provides a golf ball with higher resilience.

(f) The metal compound may be used solely or in combination of two or more of them. In addition, the amount of (f) the metal compound may be appropriately adjusted in accordance with the desired neutralization degree of (b) the α,β-unsaturated carboxylic acid having 3 to 8 carbon atoms.

[(g) Carboxylic Acid and/or Salt Thereof]

The core rubber composition may further contain (g) a carboxylic acid and/or a salt thereof. If (g) the carboxylic acid and/or the salt thereof is contained, the obtained spherical core has a greater degree of the outer-hard and inner-soft structure. Examples of (g) the carboxylic acid and/or the salt thereof include an aliphatic carboxylic acid, a salt of an aliphatic carboxylic acid, an aromatic carboxylic acid, and a salt of an aromatic carboxylic acid. (g) The carboxylic acid and/or the salt thereof may be used solely or in combination of two or more of them.

The carboxylic acid preferably has 1 or more carbon atoms, and preferably has 30 or less carbon atoms, more preferably has 18 or less carbon atoms, and even more preferably has 13 or less carbon atoms. It is noted that (g) the carboxylic acid and/or the salt thereof excludes the α,β-unsaturated carboxylic acid having 3 to 8 carbon atoms and/or the metal salt thereof used as (b) the co-crosslinking agent.

Preferable examples of the carboxylic acid and/or the salt thereof include a saturated aliphatic carboxylic acid such as caprylic acid (octanoic acid), pelargonic acid (nonanoic acid), capric acid (decanoic acid), lauric acid, myristic acid, palmitic acid, stearic acid, and behenic acid; an unsaturated aliphatic carboxylic acid such as palmitoleic acid, oleic acid, linoleic acid and arachidonic acid; an aromatic carboxylic acid such as benzoic acid, butylbenzoic acid, anisic acid (methoxybenzoic acid), dimethoxybenzoic acid, trimethoxybenzoic acid, dimethylaminobenzoic acid, chlorobenzoic acid, dichlorobenzoic acid, trichlorobenzoic acid, acetoxybenzoic acid, biphenylcarboxylic acid, naphthalene carboxylic acid, anthracene carboxylic acid, furan carboxylic acid and thenoylic acid; and a potassium salt, magnesium salt, calcium salt, aluminum salt, zinc salt, iron salt, copper salt, nickel salt, cobalt salt of these carboxylic acids.

The amount of (g) the carboxylic acid and/or the salt thereof is preferably 0.5 part by mass or more, more preferably 1.0 part by mass or more, and even more preferably 1.5 parts by mass or more, and is preferably 40 parts by mass or less, more preferably 35 parts by mass or less, and even more preferably 30 parts by mass or less, with respect to 100 parts by mass of (a) the base rubber. If the amount of (g) the carboxylic acid and/or the salt thereof is 0.5 part by mass or more, the spherical core has a greater degree of the outer-hard and inner-soft structure, and if the amount of (g) the carboxylic acid and/or the salt thereof is 40 parts by mass or less, lowering in the core hardness is suppressed, and the resilience is better.

The core rubber composition used in the present invention may further contain additives such as a pigment, a filler for adjusting a weight or the like, a peptizing agent, a softening agent or the like, where necessary.

The filler blended in the core rubber composition is used as a weight adjusting agent for mainly adjusting the weight of the golf ball obtained as a final product. The filler may be blended where necessary. Examples of the filler include an inorganic filler such as zinc oxide, barium sulfate, calcium carbonate, magnesium oxide, tungsten powder, and molybdenum powder. Zinc oxide is particularly preferably used as the filler. It is considered that zinc oxide functions as a vulcanization activator and increases the hardness of the entire core. The amount of the filler is preferably 0.5 part by mass or more, more preferably 1 part by mass or more, and is preferably 30 parts by mass or less, more preferably 25 parts by mass or less, and even more preferably 20 parts by mass or less, with respect to 100 parts by mass of (a) the base rubber. This is because if the amount of the filler is less than 0.5 part by mass, it is difficult to adjust the weight, while if the amount of the filler exceeds 30 parts by mass, the weight ratio of the rubber component is reduced and thus the resilience tends to be lowered.

The amount of the peptizing agent is preferably 0.1 part by mass or more and 5 parts by mass or less with respect to 100 parts by mass of (a) the base rubber.

[Core]

The core of the golf ball according to the present invention can be obtained by mixing and kneading the above-described core rubber composition, and molding the kneaded product in a mold. The kneading method is not particularly limited, for example, a conventional kneading machine such as a kneading roll, a Banbury mixer, and a kneader can be used in the kneading method. The molding condition is not particularly limited, and the molding is generally carried out at a temperature in a range from 130° C. to 200° C. under a pressure of 2.9 MPa to 11.8 MPa for 10 minutes to 60 minutes. For example, it is preferred that the core rubber composition is heated at a temperature in a range from 130° C. to 200° C. for 10 to 60 minutes, or alternatively the core rubber composition is subjected to a two-step heating, i.e. the core rubber composition is heated at a temperature in a range from 130° C. to 150° C. for 20 to 40 minutes and then heated at a temperature in a range from 160° C. to 180° C. for 5 to 15 minutes.

The surface hardness (Hs) of the core of the golf ball according to the present invention is preferably 60 or more, more preferably 62 or more, and even more preferably 65 or more, and is preferably 95 or less, more preferably 92 or less, and even more preferably 90 or less, in Shore C hardness. If the surface hardness (Hs) of the core is 60 or more in Shore C hardness, the core has better resilience. In addition, if the surface hardness (Hs) of the core is 95 or less in Shore C hardness, the shot feeling on driver shots is better.

The center hardness (H0) of the core is preferably 40 or more, more preferably 45 or more, and even more preferably 50 or more, in Shore C hardness. If the center hardness (H0) of the core is 40 or more in Shore C hardness, the core is not excessively soft and thus the resilience is better. In addition, the center hardness (H0) of the core is preferably 80 or less, more preferably 78 or less, and even more preferably 75 or less, in Shore C hardness. If the center hardness (H0) of the core is 80 or less in Shore C hardness, the core is not excessively hard and thus the shot feeling is better.

The core of the golf ball according to the present invention is characterized in that the core has a constant hardness in the vicinity of the surface while having an outer-hard and inner-soft structure.

The hardness difference (Hs−H0) between the surface hardness (Hs) and the center hardness (H0) of the core is preferably 0 or more, more preferably 2 or more, and even more preferably 4 or more, and is preferably 25 or less, more preferably 22 or less, and even more preferably 20 or less, in Shore C hardness. If the hardness difference (Hs−H0)

between the surface hardness (Hs) and the center hardness (H0) of the core falls within the above range, the golf ball travels a great flight distance while maintaining the shot feeling.

The hardness (H50) at 50% point of the core radius from the central point of the core is preferably 65 or more, more preferably 68 or more, and even more preferably 70 or more, in Shore C hardness. In addition, the hardness (H50) at 50% point of the core radius from the central point of the core is preferably 85 or less, more preferably 82 or less, and even more preferably 80 or less in Shore C hardness. If the hardness (H50) at 50% point of the core radius from the central point of the core falls within the above range, the shot feeling is more easily maintained without increasing the compression deformation amount.

The hardness difference (Hs−H50) between the surface hardness (Hs) of the core and the hardness (H50) at 50% point of the core radius from the central point of the core is preferably −10 or more, more preferably −7 or more, and even more preferably −5 or more, and is preferably 12 or less, more preferably 11.5 or less, and even more preferably 11 or less in Shore C hardness. If the hardness difference (Hs−H50) between the surface hardness (Hs) of the core and the hardness (H50) at 50% point of the core radius from the central point of the core falls within the above range, the shot feeling is more easily maintained without increasing the compression deformation amount.

The hardness difference (Hs−H75) between the surface hardness (Hs) of the core and the hardness (H75) at 75% point of the core radius from the central point of the core is preferably −10 or more, more preferably −7 or more, and even more preferably −5 or more, and is preferably 15 or less, more preferably 13 or less, and even more preferably 11 or less in Shore C hardness. If the hardness difference (Hs−H75) between the surface hardness (Hs) of the core and the hardness (H75) at 75% point of the core radius from the central point of the core falls within the above range, the shot feeling is easily maintained without increasing the compression deformation amount.

The ratio ((Hs−H0)/SCH) of the hardness difference (Hs−H0) between the surface hardness (Hs) and the center hardness (H0) of the core to the compression deformation amount SCH of the core which will be described later is preferably 7.0 or less, more preferably 6.0 or less, and even more preferably 5.0 or less, and is preferably −5.0 or more, more preferably −3.0 or more, and even more preferably −1.0 or more. If the ratio ((Hs−H0)/SCH) of the hardness difference (Hs−H0) between the surface hardness (Hs) and the center hardness (H0) of the core to the compression deformation amount SCH of the core which will be described later falls within the above range, the shot feeling is more easily improved without increasing the compression deformation amount.

The diameter of the core of the golf ball according to the present invention is preferably 34.8 mm or more, more preferably 36.8 mm or more, and even more preferably 38.8 mm or more, and is preferably 42.2 mm or less, more preferably 41.8 mm or less, even more preferably 41.2 mm or less, and most preferably 40.8 mm or less. If the diameter of the core is 34.8 mm or more, the thickness of the cover does not become too thick and thus the resilience becomes better. On the other hand, if the diameter of the core is 42.2 mm or less, the thickness of the cover does not become too thin and thus the cover functions better.

When the core has a diameter in a range from 34.8 mm to 42.2 mm, the compression deformation amount (SCH) of the core (shrinking amount of the core along the compression direction) when applying a load from an initial load of 98 N to a final load of 1275 N is preferably 2.0 mm or more, more preferably 2.3 mm or more, and even more preferably 2.5 mm or more, and is preferably 5.0 mm or less, more preferably 4.5 mm or less, and even more preferably 4.3 mm or less. If the compression deformation amount is 2.0 mm or more, the shot feeling is better, and if the compression deformation amount is 5.0 mm or less, the resilience is better.

[Cover]

The cover of the golf ball according to the present invention is formed from a cover composition containing a resin component. Examples of the resin component include an ionomer resin, a thermoplastic polyurethane elastomer having a trade name of "Elastollan (registered trademark)" available from BASF Japan Ltd., a thermoplastic polyamide elastomer having a trade name of "Pebax (registered trademark)" available from Arkema K. K., a thermoplastic polyester elastomer having a trade name of "Hytrel (registered trademark)" available from Du Pont-Toray Co., Ltd., and a thermoplastic styrene elastomer having a trade name of "Tefabloc" available from Mitsubishi Chemical Corporation.

Examples of the ionomer resin include a product obtained by neutralizing at least a part of carboxyl groups in a binary copolymer composed of an olefin and an $\alpha,\beta$-unsaturated carboxylic acid having 3 to 8 carbon atoms with a metal ion; a product obtained by neutralizing at least a part of carboxyl groups in a ternary copolymer composed of an olefin, an $\alpha,\beta$-unsaturated carboxylic acid having 3 to 8 carbon atoms and an $\alpha,\beta$-unsaturated carboxylic acid ester with a metal ion; and a mixture thereof. The olefin is preferably an olefin having 2 to 8 carbon atoms. Examples of the olefin include ethylene, propylene, butene, pentene, hexene, heptene and octane, and ethylene is particularly preferred. Examples of the $\alpha,\beta$-unsaturated carboxylic acid having 3 to 8 carbon atoms include acrylic acid, methacrylic acid, fumaric acid, maleic acid and crotonic acid, and acrylic acid or methacrylic acid is particularly preferred. In addition, examples of the $\alpha,\beta$-unsaturated carboxylic acid ester include methyl ester, ethyl ester, propyl ester, n-butyl ester, isobutyl ester of acrylic acid, methacrylic acid, fumaric acid and maleic acid, and acrylic acid ester or methacrylic acid ester is particularly preferred. Among them, as the ionomer resin, a metal ion neutralized product of ethylene-(meth)acrylic acid binary copolymer or a metal ion neutralized product of ethylene-(meth)acrylic acid-(meth)acrylic acid ester ternary copolymer is preferred.

The cover composition for forming the cover of the golf ball according to the present invention preferably contains a thermoplastic polyurethane elastomer or an ionomer resin as the resin component. It is also preferred that when the ionomer resin is used, a thermoplastic styrene elastomer is used in combination. The amount of the polyurethane or ionomer resin in the resin component of the cover composition is preferably 50 mass % or more, more preferably 60 mass % or more, and even more preferably 70 mass % or more.

In addition to the resin component, the cover composition may further contain a pigment component such as a white pigment (e.g. titanium oxide), a blue pigment and a red pigment, a weight adjusting agent such as zinc oxide, calcium carbonate and barium sulfate, a dispersant, an antioxidant, an ultraviolet absorber, a light stabilizer, a fluorescent material or fluorescent brightener, as long as they do not impair the performance of the cover.

The amount of the white pigment (e.g. titanium oxide) is preferably 0.5 part or more, more preferably 1 part or more, and is preferably 10 parts or less, more preferably 8 parts or less, with respect to 100 parts by mass of the resin component constituting the cover. If the amount of the white pigment is 0.5 part by mass or more, it is possible to impart the opacity to the resultant cover. In addition, if the amount of the white pigment is more than 10 parts by mass, the durability of the resultant cover may deteriorate.

The slab hardness of the cover composition is preferably set in accordance with the desired performance of the golf ball. For example, in case of a so-called distance golf ball which focuses on a flight distance, the cover composition preferably has a slab hardness of 50 or more, more preferably 55 or more, and even more preferably 60 or more in shore D hardness, and preferably has a slab hardness of 80 or less, more preferably 70 or less, and even more preferably 68 or less in shore D hardness. If the cover composition has a slab hardness of 50 or more, the obtained golf ball has a higher launch angle and a lower spin rate on driver shots and iron shots, and thus travels a greater distance. In addition, if the cover composition has a slab hardness of 80 or less, the obtained golf ball has better durability. Further, in case of a so-called spin golf ball which focuses on controllability, the cover composition preferably has a slab hardness of less than 50 in Shore D hardness, and preferably has a slab hardness of 20 or more, more preferably 25 or more, and even more preferably 30 or more in shore D hardness. If the cover composition has a slab hardness of less than 50 in Shore D hardness, the obtained golf ball readily stops on the green due to the high spin rate on approach shots. In addition, if the cover composition has a slab hardness of 20 or more in Shore D hardness, the abrasion resistance is enhanced. In case of a plurality of cover layers, the slab hardness of the cover composition constituting each layer may be identical or different.

Examples of the method for molding the cover of the golf ball according to the present invention include a method which comprises molding the cover composition into a hollow shell, covering the core with a plurality of the hollow shells and performing compression molding (preferably a method which comprises molding the cover composition into a hollow half shell, covering the core with two of the half shells and performing compression molding); and a method which comprises injection molding the cover composition directly onto the core.

When molding the cover in a compression molding method, molding of the half shell can be performed by either the compression molding method or the injection molding method, and the compression molding method is preferred. Compression molding the cover composition into a half shell can be carried out, for example, under a pressure of 1 MPa or more and 20 MPa or less at a temperature of −20° C. or more and 70° C. or less relative to the flow beginning temperature of the cover composition. By performing the molding under the above conditions, the half shell having a uniform thickness can be formed. Examples of the method for molding the cover by using the half shell include a method which comprises covering the core with two of the half shells and then performing compression molding. Compression molding half shells into the cover can be carried out, for example, under a pressure of 0.5 MPa or more and 25 MPa or less at a temperature of −20° C. or more and 70° C. or less relative to the flow beginning temperature of the cover composition. By performing the molding under the above conditions, the golf ball cover having a uniform thickness can be formed.

In the case of injection molding the cover composition into the cover, the cover composition extruded in a pellet form may be used for injection molding, or the cover materials such as the base resin components and the pigment may be dry blended, followed by directly injection molding the blended material. It is preferred to use upper and lower molds having a hemi-spherical cavity and pimples for forming the cover, wherein a part of the pimples also serves as a retractable hold pin. When molding the cover by injection molding, the hold pin is protruded to hold the core, the cover composition is charged and then cooled to obtain the cover. For example, the cover composition heated at a temperature ranging from 200° C. to 250° C. is charged into a mold held under a pressure of 9 MPa to 15 MPa for 0.5 to 5 seconds, and after cooling for 10 to 60 seconds, the mold is opened to obtain the cover.

When molding the cover, concave portions called "dimple" are usually formed on the surface of the cover. The total number of dimples formed on the cover is preferably 200 or more and 500 or less. If the total number is less than 200, the dimple effect is hardly obtained. On the other hand, if the total number exceeds 500, the dimple effect is hardly obtained because the size of the respective dimples is small. The shape (shape in a plan view) of dimples includes, for example, without limitation, a circle, a polygonal shape such as a roughly triangular shape, a roughly quadrangular shape, a roughly pentagonal shape, a roughly hexagonal shape, and other irregular shape. The shape of dimples is employed solely or at least two of them may be used in combination.

The thickness of the cover is preferably 4.0 mm or less, more preferably 3.0 mm or less, and even more preferably 2.0 mm or less. If the thickness of the cover is 4.0 mm or less, the obtained golf ball has better resilience and shot feeling. The thickness of the cover is preferably 0.3 mm or more, more preferably 0.5 mm or more, and even more preferably 0.8 mm or more. If the thickness of the cover is less than 0.3 mm, the durability or wear resistance of the cover may be lowered. In the case that the golf ball comprises a plurality of cover layers, the total thickness of a plurality of cover layers preferably falls within the above range.

The golf ball body having the cover formed thereon is ejected from the mold, and is preferably subjected to surface treatments such as deburring, cleaning and sandblast where necessary. In addition, if desired, a paint film or a mark may be formed. The thickness of the paint film is not particularly limited, and is preferably 5 μm or more, more preferably 7 μm or more, and is preferably 50 μm or less, more preferably 40 μm or less, and even more preferably 30 μm or less. If the thickness of the paint film is less than 5 μm, the paint film is easy to wear off due to the continued use of the golf ball, and if the thickness of the paint film exceeds 50 μm, the dimple effect is reduced and thus the flight performance of the golf ball may be lowered.

[Golf Ball]

The construction of the golf ball according to the present invention is not particularly limited, as long as the golf ball comprises a core and at least one cover covering the core. The FIGURE is a partially cutaway cross-sectional view of a golf ball 1 according to one embodiment of the present invention. The golf ball 1 has a spherical core 2, and a cover 3 covering the spherical core 2. A plurality of dimples 31 are formed on the surface of the cover. Other portions than the dimples 31 on the surface of the golf ball 1 are lands 32. The golf ball 1 is provided with a paint layer and a mark layer on an outer side of the cover 3, but these layers are not depicted.

The core is preferably spherical. In addition, the construction of the core may be either a single layered construction or a multiple layered construction, and the single layered construction is preferable. Unlike the multiple layered core, the single layered core does not have an energy loss at the interface of the multiple layered core when being hit, and thus has better resilience. In addition, the cover has a construction composed of at least one layer, and may have either a single layered construction or a multiple layered construction composed of at least two layers. Examples of the golf ball according to the present invention include a two-piece golf ball composed of a core and a single layered cover disposed around the core, a multi-piece golf ball (including a three-piece golf ball) composed of a core and at least two cover layers disposed around the core, and a wound golf ball composed of a core, a rubber thread layer formed around the core and a cover disposed around the rubber thread layer. The present invention can be suitably applied to any one of the above golf balls.

The golf ball according to the present invention preferably has a diameter in a range from 40 mm to 45 mm. In light of satisfying a regulation of US Golf Association (USGA), the diameter is particularly preferably 42.67 mm or more. In light of prevention of air resistance, the diameter is more preferably 44 mm or less, particularly preferably 42.80 mm or less. In addition, the golf ball of the present invention preferably has a mass of 40 g or more and 50 g or less. In light of obtaining greater inertia, the mass is more preferably 44 g or more, particularly preferably 45.00 g or more. In light of satisfying a regulation of USGA, the mass is particularly preferably 45.93 g or less.

When the golf ball according to the present invention has a diameter in a range from 40 mm to 45 mm, the compression deformation amount of the golf ball (shrinking amount of the golf ball along the compression direction) when applying a load from 98 N as an initial load to 1275 N as a final load to the golf ball is preferably 2.0 mm or more, more preferably 2.3 mm or more, and even more preferably 2.5 mm or more, and is preferably 4.0 mm or less, more preferably 3.5 mm or less, and even more preferably 3.3 mm or less. If the compression deformation amount is 2.0 mm or more, the golf ball does not become excessively hard, and thus the shot feeling thereof becomes better. On the other hand, if the compression deformation amount is 4.0 mm or less, the resilience of the golf ball becomes higher.

EXAMPLES

Hereinafter, the present invention will be described in detail by way of examples. However, the present invention is not limited to the examples described below, and various changes and modifications without departing from the gist of the present invention are included in the scope of the present invention.

[Evaluation Method]
(1) Compression Deformation Amount (SCH)

The deformation amount of the core or golf ball along the compression direction (the shrinking amount of the core or golf ball along the compression direction), when applying a load from an initial load of 98 N to a final load of 1275 N to the core or golf ball, was measured.

(2) Core Hardness (Shore C Hardness)

The hardness measured on the surface of the core was adopted as the surface hardness of the core. In addition, the core was cut into two hemispheres to obtain a cut plane, and the hardness at the central point of the cut plane and the hardness at the predetermined distances from the central point were measured. It is noted that the hardness of the core was measured at four points at the predetermined distances from the central point of the cut plane, and the average value thereof was calculated. The hardness was measured with an automatic hardness tester (Digitest II, available from Bareiss company) using a testing device of "Shore C".

(3) Slab Hardness (Shore D Hardness)

Sheets with a thickness of about 2 mm were produced by injection molding the cover composition, and stored at 23° C. for two weeks. At least three of these sheets were stacked on one another so as not to be affected by the measuring substrate on which the sheets were placed, and the hardness of the stack was measured with an automatic hardness tester (Digitest II, available from Bareiss company) using a detector of "Shore D", (4) Shot Feeling on Driver Shots An actual hitting test was carried out by ten amateur golfers (high skilled person) using a driver. Feeling at the shot was evaluated by each person based on the following standard. Major result of the evaluations of ten golfers was employed as the shot feeling of the golf ball.

Evaluation Standard:
E (Excellent): Impact is low and feeling is good.
G (Good): There is impact but feeling is the good one.
F (Fair): Normal feeling.

(5) Flight Distance on Driver Shots

A W #1 driver provided with a metal head (XXIO S, loft angel: 11°, available from Sumitomo Rubber Industries, Ltd.) was installed on a swing robot M/C available from Golf Laboratories, Inc. The golf ball was hit at a head speed of 40 m/sec, and the flight distance (the distance from the launch point to the stop point) was measured. The measurement was conducted twelve times for each golf ball, and the average value thereof was adopted as the measurement value for that golf ball. It is noted that the flight distance of each golf ball in Table 1 is shown as a difference from the flight distance of Golf ball No. 9; the flight distance of each golf ball in Table 2 is shown as a difference from the flight distance of Golf ball No. 18; the flight distance of Golf balls No. 19 to 20 and 23 to 26 in Table 3 is shown as a difference from the flight distance of Golf ball No. 9, and the flight distance of Golf balls No. 21 to 22 in Table 3 is shown as a difference from the flight distance of Golf ball No. 18; the flight distance of each golf ball in Table 4 is shown as a difference from the flight distance of Golf ball No. 35; the flight distance of each golf ball in Table 5 is shown as a difference from the flight distance of Golf ball No. 44; the flight distance of each golf ball in Table 6 is shown as a difference from the flight distance of Golf ball No. 53; the flight distance of each golf ball in Table 7 is shown as a difference from the flight distance of Golf ball No. 62; the flight distance of each golf ball in Table 8 is shown as a difference from the flight distance of Golf ball No. 71; and the flight distance of each golf ball in Table 9 is shown as a difference from the flight distance of Golf ball No. 80.

[Production of Golf Ball]
(1) Production of Core

The rubber compositions having the formulations shown in Table 1 to Table 9 were kneaded with a kneading roll, and heat pressed in upper and lower molds, each having a hemispherical cavity, at 170° C. for 30 minutes to obtain spherical cores having a diameter of 39.8 mm. It is noted that an appropriate amount of barium sulfate was added such that the obtained golf ball had a mass of 45.3 g.

TABLE 1

| | | Golf ball No. | 1 | 2 | 3 | 4 | 5 | 6 | 7 | 8 | 9 |
|---|---|---|---|---|---|---|---|---|---|---|---|
| Core rubber composition | Formulation (parts by mass) | (a) BR730 | 100 | 100 | 100 | 100 | 100 | 100 | 100 | 100 | 100 |
| | | (b) ZN-DA90S | 27 | 29 | 35 | 36 | 38 | 37 | 55 | 55 | 27 |
| | | (c) Dicumyl peroxide | 0.8 | 0.8 | 0.8 | 0.8 | 0.8 | 0.8 | 0.8 | 0.8 | 0.8 |
| | | (f) Zinc oxide | 5.0 | 5.0 | 5.0 | 5.0 | 5.0 | 5.0 | 5.0 | 5.0 | 5.0 |
| | | (e) PBDS | 1.0 | 1.0 | 1.0 | 1.0 | 1.0 | 1.0 | 1.0 | 1.0 | 1.0 |
| | | (e) PCTP-Zn | — | — | — | — | — | — | — | — | — |
| | | (e) NOCCELER M-P | — | — | — | — | — | — | — | — | — |
| | | (d) 4-Methoxyphenol | 0.05 | 0.10 | 0.25 | 0.50 | 1.00 | 2.00 | 3.00 | 5.00 | — |
| | | Barium sulfate | *1) | *1) | *1) | *1) | *1) | *1) | *1) | *1) | *1) |
| Core | | Compression deformation amount SCH (mm) | 3.3 | 3.3 | 3.3 | 3.3 | 3.3 | 3.3 | 4.0 | 4.5 | 3.3 |
| | | Center hardness H0 | 63 | 66 | 64 | 62 | 71 | 74 | 65 | 62 | 63 |
| | | Hardness H12.5 at 12.5% point | 68 | 68 | 69 | 66 | 74 | 74 | 65 | 62 | 68 |
| | | Hardness H25 at 25% point | 71 | 70 | 72 | 71 | 77 | 74 | 65 | 62 | 71 |
| | | Hardness H37.5 at 37.5% point | 73 | 71 | 73 | 75 | 77 | 73 | 63 | 60 | 73 |
| | | Hardness H50 at 50% point | 73 | 70 | 73 | 77 | 76 | 72 | 61 | 58 | 73 |
| | | Hardness H62.5 at 62.5% point | 73 | 71 | 76 | 76 | 74 | 73 | 59 | 56 | 73 |
| | | Hardness H75 at 75% point | 76 | 75 | 74 | 73 | 72 | 71 | 59 | 56 | 76 |
| | | Surface hardness Hs | 86 | 81 | 76 | 75 | 78 | 78 | 60 | 57 | 86 |
| | | Surface hardness Hs-Center hardness H0 | 23 | 15 | 12 | 13 | 7 | 4 | −5 | −5 | 23 |
| | | Surface hardness Hs-Hardness H50 at 50% point | 13 | 11 | 3 | −2 | 2 | 6 | −1 | −1 | 13 |
| | | Surface hardness Hs-Hardness H75 at 75% point | 10 | 6 | 2 | 2 | 6 | 7 | 1 | 1 | 10 |
| | | (Hs-H0)/SCH | 7.0 | 4.5 | 3.6 | 3.9 | 2.1 | 1.2 | −1.3 | −1.1 | 7.0 |
| Golf ball | | Compression deformation amount SCH (mm) | 3.0 | 3.0 | 3.0 | 3.0 | 3.0 | 3.0 | 3.8 | 4.3 | 3.0 |
| | | Flight distance on driver shots (yd) | 0.0 | 0.2 | 0.7 | 1.2 | 1.7 | 2.1 | 0.0 | −0.4 | Standard (0.0) |
| | | Shot feeling on driver shots | F | G | E | E | E | E | F | F | F |

*1) An appropriate amount of barium sulfate was added such that the obtained golf ball had a mass of 45.3 g.

TABLE 2

| | | Golf ball No. | 10 | 11 | 12 | 13 | 14 | 15 | 16 | 17 | 18 |
|---|---|---|---|---|---|---|---|---|---|---|---|
| Core rubber composition | Formulation (parts by mass) | (a) BR730 | 100 | 100 | 100 | 100 | 100 | 100 | 100 | 100 | 100 |
| | | (b) ZN-DA90S | 27 | 29 | 35 | 36 | 38 | 37 | 55 | 55 | 27 |
| | | (c) Dicumyl peroxide | 0.8 | 0.8 | 0.8 | 0.8 | 0.8 | 0.8 | 0.8 | 0.8 | 0.8 |
| | | (f) Zinc oxide | 5.0 | 5.0 | 5.0 | 5.0 | 5.0 | 5.0 | 5.0 | 5.0 | 5.0 |
| | | (e) PBDS | — | — | — | — | — | — | — | — | — |
| | | (e) PCTP-Zn | 1.0 | 1.0 | 1.0 | 1.0 | 1.0 | 1.0 | 1.0 | 1.0 | 1.0 |
| | | (e) NOCCELER M-P | — | — | — | — | — | — | — | — | — |
| | | (d) 4-Methoxyphenol | 0.05 | 0.10 | 0.25 | 0.50 | 1.00 | 2.00 | 3.00 | 5.00 | — |
| | | Barium sulfate | *1) | *1) | *1) | *1) | *1) | *1) | *1) | *1) | *1) |
| | | Compression deformation amount SCH (mm) | 3.3 | 3.3 | 3.3 | 3.3 | 3.3 | 3.3 | 4.0 | 4.5 | 3.3 |
| | | Center hardness H0 | 63 | 66 | 64 | 62 | 71 | 74 | 65 | 62 | 63 |
| | | Hardness H12.5 at 12.5% point | 68 | 68 | 69 | 66 | 74 | 74 | 65 | 62 | 68 |
| | | Hardness H25 at 25% point | 71 | 70 | 72 | 71 | 77 | 74 | 65 | 62 | 71 |
| | | Hardness H37.5 at 37.5% point | 73 | 71 | 73 | 75 | 77 | 73 | 63 | 60 | 73 |
| | | Hardness H50 at 50% point | 73 | 70 | 73 | 77 | 76 | 72 | 61 | 58 | 73 |
| Core | | Hardness H62.5 at 62.5% point | 73 | 71 | 76 | 76 | 74 | 73 | 59 | 56 | 73 |
| | | Hardness H75 at 75% point | 76 | 75 | 74 | 73 | 72 | 71 | 59 | 56 | 76 |
| | | Surface hardness Hs | 86 | 81 | 76 | 75 | 78 | 78 | 60 | 57 | 86 |
| | | Surface hardness Hs-Center hardness H0 | 23 | 15 | 12 | 13 | 7 | 4 | −5 | −5 | 23 |
| | | Surface hardness Hs-Hardness H50 at 50% point | 13 | 11 | 3 | −2 | 2 | 6 | −1 | −1 | 13 |
| | | Surface hardness Hs-Hardness H75 at 75% point | 10 | 6 | 2 | 2 | 6 | 7 | 1 | 1 | 10 |
| | | (Hs-H0)/SCH | 7.0 | 4.5 | 3.6 | 3.9 | 2.1 | 1.2 | −1.3 | −1.1 | 7.0 |
| | | Compression deformation amount SCH (mm) | 3.0 | 3.0 | 3.0 | 3.0 | 3.0 | 3.0 | 3.8 | 4.3 | 3.0 |
| Golf ball | | Flight distance on driver shots (yd) | 0.0 | 0.2 | 0.7 | 1.2 | 1.7 | 2.1 | 0.0 | −0.4 | Standard (0.0) |
| | | Shot feeling on driver shots | F | G | E | E | E | E | F | F | F |

*1) An appropriate amount of barium sulfate was added such that the obtained golf ball had a mass of 45.3 g.

TABLE 3

| Golf ball No. | | | 19 | 20 | 21 | 22 | 23 | 24 | 25 | 26 |
|---|---|---|---|---|---|---|---|---|---|---|
| Core rubber composition | Formulation (parts by mass) | (a) BR730 | 100 | 100 | 100 | 100 | 100 | 100 | 100 | 100 |
| | | (b) ZN-DA90S | 35 | 38 | 35 | 38 | 37 | 33 | 38 | 35 |
| | | (c) Dicumyl peroxide | 0.8 | 0.8 | 0.8 | 0.8 | 1.2 | 1.2 | 1.2 | 1.2 |
| | | (f) Zinc oxide | 5.0 | 5.0 | 5.0 | 5.0 | 5.0 | 5.0 | 5.0 | 5.0 |
| | | (e) PBDS | 1.0 | 1.0 | — | — | 1.0 | 1.0 | 1.0 | 1.0 |
| | | (e) PCTP-Zn | — | — | 1.0 | 1.0 | — | — | — | — |
| | | (e) NOCCELER M-P | 1.0 | 1.0 | 1.0 | 1.0 | — | 1.0 | — | 1.0 |
| | | (d) 4-Methoxyphenol | 0.50 | 1.00 | 0.50 | 1.00 | 0.50 | 0.50 | 1.00 | 1.00 |
| | | Barium sulfate | *1) | *1) | *1) | *1) | *1) | *1) | *1) | *1) |
| Core | Compression deformation amount SCH (mm) | | 3.3 | 3.3 | 3.3 | 3.3 | 3.3 | 3.3 | 3.3 | 3.3 |
| | Center hardness H0 | | 64 | 60 | 64 | 60 | 55 | 57 | 59 | 56 |
| | Hardness H12.5 at 12.5% point | | 68 | 64 | 68 | 64 | 66 | 68 | 67 | 65 |
| | Hardness H25 at 25% point | | 71 | 69 | 71 | 69 | 71 | 72 | 71 | 71 |
| | Hardness H37.5 at 37.5% point | | 72 | 74 | 72 | 74 | 72 | 73 | 74 | 72 |
| | Hardness H50 at 50% point | | 75 | 76 | 75 | 76 | 73 | 73 | 76 | 75 |
| | Hardness H62.5 at 62.5% point | | 76 | 75 | 76 | 75 | 77 | 76 | 75 | 76 |
| | Hardness H75 at 75% point | | 75 | 74 | 75 | 74 | 76 | 76 | 74 | 75 |
| | Surface hardness Hs | | 77 | 77 | 77 | 77 | 79 | 79 | 78 | 78 |
| | Surface hardness Hs-Center hardness H0 | | 13 | 17 | 13 | 17 | 24 | 22 | 19 | 22 |
| | Surface hardness Hs-Hardness H50 at 50% point | | 2 | 1 | 2 | 1 | 6 | 6 | 2 | 3 |
| | Surface hardness Hs-Hardness H75 at 75% point | | 2 | 3 | 2 | 3 | 3 | 3 | 4 | 3 |
| | (Hs-H0)/SCH | | 3.9 | 5.2 | 3.9 | 5.2 | 7.3 | 6.7 | 5.8 | 6.7 |
| Golf ball | Compression deformation amount SCH (mm) | | 3.0 | 3.0 | 3.0 | 3.0 | 3.0 | 3.0 | 3.0 | 3.0 |
| | Flight distance on driver shots (yd) | | 1.2 | 1.7 | 1.2 | 1.7 | 0.9 | 1.0 | 1.3 | 1.6 |
| | Shot feeling on driver shots | | E | E | E | E | E | E | E | E |

*1) An appropriate amount of barium sulfate was added such that the obtained golf ball had a mass of 45.3 g.

TABLE 4

| Golf ball No. | | | 27 | 28 | 29 | 30 | 31 | 32 | 33 | 34 | 35 |
|---|---|---|---|---|---|---|---|---|---|---|---|
| Core rubber composition | Formulation (parts by mass) | (a) BR730 | 100 | 100 | 100 | 100 | 100 | 100 | 100 | 100 | 100 |
| | | (b) ZN-DA90S | 27 | 29 | 35 | 36 | 38 | 37 | 55 | 55 | 27 |
| | | (c) Dicumyl peroxide | 0.8 | 0.8 | 0.8 | 0.8 | 0.8 | 0.8 | 0.8 | 0.8 | 0.8 |
| | | (f) Zinc oxide | 5.0 | 5.0 | 5.0 | 5.0 | 5.0 | 5.0 | 5.0 | 5.0 | 5.0 |
| | | (e) PBDS | 1.0 | 1.0 | 1.0 | 1.0 | 1.0 | 1.0 | 1.0 | 1.0 | 1.0 |
| | | (e) PCTP-Zn | — | — | — | — | — | — | — | — | — |
| | | (e) NOCCELER M-P | — | — | — | — | — | — | — | — | — |
| | | (d) 4-Ethoxyphenol | 0.05 | 0.10 | 0.25 | 0.50 | 1.00 | 2.00 | 3.00 | 5.00 | — |
| | | Barium sulfate | *1) | *1) | *1) | *1) | *1) | *1) | *1) | *1) | *1) |
| | Compression deformation amount SCH (mm) | | 3.3 | 3.3 | 3.3 | 3.3 | 3.3 | 3.3 | 4.0 | 4.5 | 3.3 |
| | Center hardness H0 | | 63 | 61 | 61 | 61 | 62 | 65 | 65 | 62 | 63 |
| | Hardness H12.5 at 12.5% point | | 68 | 67 | 67 | 67 | 67 | 67 | 65 | 62 | 68 |
| | Hardness H25 at 25% point | | 71 | 71 | 71 | 71 | 72 | 74 | 65 | 62 | 71 |
| | Hardness H37.5 at 37.5% point | | 73 | 76 | 76 | 76 | 75 | 75 | 63 | 60 | 73 |
| | Hardness H50 at 50% point | | 73 | 79 | 79 | 78 | 75 | 71 | 61 | 58 | 73 |
| Core | Hardness H62.5 at 62.5% point | | 73 | 78 | 77 | 76 | 74 | 71 | 59 | 56 | 73 |
| | Hardness H75 at 75% point | | 76 | 75 | 75 | 74 | 73 | 70 | 59 | 56 | 76 |
| | Surface hardness Hs | | 86 | 75 | 75 | 76 | 77 | 79 | 60 | 57 | 86 |
| | Surface hardness Hs-Center hardness H0 | | 23 | 14 | 14 | 15 | 15 | 14 | −5 | −5 | 23 |
| | Surface hardness Hs-Hardness H50 at 50% point | | 13 | −4 | −4 | −2 | 2 | 8 | −1 | −1 | 13 |
| | Surface hardness Hs-Hardness H75 at 75% point | | 10 | 0 | 0 | 2 | 4 | 9 | 1 | 1 | 10 |
| | (Hs-H0)/SCH | | 7.0 | 4.2 | 4.2 | 4.5 | 4.5 | 4.2 | −1.3 | −1.1 | 7.0 |
| | Compression deformation amount SCH (mm) | | 3.0 | 3.0 | 3.0 | 3.0 | 3.0 | 3.0 | 3.8 | 4.3 | 3.0 |
| Golf ball | Flight distance on driver shots (yd) | | 0.0 | 0.2 | 1.1 | 1.2 | 1.4 | 1.8 | 0.0 | −0.4 | Standard (0.0) |
| | Shot feeling on driver shots | | F | G | E | E | E | E | F | F | F |

*1) An appropriate amount of barium sulfate was added such that the obtained golf ball had a mass of 45.3 g.

TABLE 5

| | | Golf ball No. | 36 | 37 | 38 | 39 | 40 | 41 | 42 | 43 | 44 |
|---|---|---|---|---|---|---|---|---|---|---|---|
| Core rubber composition | Formulation (parts by mass) | (a) BR730 | 100 | 100 | 100 | 100 | 100 | 100 | 100 | 100 | 100 |
| | | (b) ZN-DA90S | 27 | 29 | 35 | 36 | 38 | 37 | 55 | 55 | 27 |
| | | (c) Dicumyl peroxide | 0.8 | 0.8 | 0.8 | 0.8 | 0.8 | 0.8 | 0.8 | 0.8 | 0.8 |
| | | (f) Zinc oxide | 5.0 | 5.0 | 5.0 | 5.0 | 5.0 | 5.0 | 5.0 | 5.0 | 5.0 |
| | | (e) PBDS | — | — | — | — | — | — | — | — | — |
| | | (e) PCTP-Zn | 1.0 | 1.0 | 1.0 | 1.0 | 1.0 | 1.0 | 1.0 | 1.0 | 1.0 |
| | | (e) NOCCELER M-P | — | — | — | — | — | — | — | — | — |
| | | (d) 4-ethoxyphenol | 0.05 | 0.10 | 0.25 | 0.50 | 1.00 | 2.00 | 3.00 | 5.00 | — |
| | | Barium sulfate | *1) | *1) | *1) | *1) | *1) | *1) | *1) | *1) | *1) |
| Core | | Compression deformation amount SCH(mm) | 3.3 | 3.3 | 3.3 | 3.3 | 3.3 | 3.3 | 4.0 | 4.5 | 3.3 |
| | | Center hardness H0 | 63 | 61 | 61 | 61 | 62 | 65 | 65 | 62 | 63 |
| | | Hardness H12.5 at 12.5% point | 68 | 67 | 67 | 67 | 67 | 68 | 65 | 62 | 68 |
| | | Hardness H25 at 25% point | 71 | 71 | 71 | 71 | 72 | 74 | 65 | 62 | 71 |
| | | Hardness H37.5 at 37.5% point | 73 | 76 | 76 | 76 | 75 | 75 | 63 | 60 | 73 |
| | | Hardness H50 at 50% point | 73 | 79 | 79 | 78 | 75 | 71 | 61 | 58 | 73 |
| | | Hardness H62.5 at 62.5% point | 73 | 78 | 77 | 76 | 74 | 71 | 59 | 56 | 73 |
| | | Hardness H75 at 75% point | 76 | 75 | 75 | 74 | 73 | 70 | 59 | 56 | 76 |
| | | Surface hardness Hs | 86 | 75 | 75 | 76 | 77 | 79 | 60 | 57 | 86 |
| | | Surface hardness Hs-Center hardness H0 | 23 | 14 | 14 | 15 | 15 | 14 | −5 | −5 | 23 |
| | | Surface hardness Hs-Hardness H50 at 50% point | 13 | −4 | −4 | −2 | 2 | 8 | −1 | −1 | 13 |
| | | Surface hardness Hs-75% point hardness 75 | 10 | 0 | 0 | 2 | 4 | 9 | 1 | 1 | 10 |
| | | (Hs-H0)/SCH | 7.0 | 4.2 | 4.2 | 4.5 | 4.5 | 4.2 | −1.3 | −1.1 | 7.0 |
| Golf ball | | Compression deformation amount SCH (mm) | 3.0 | 3.0 | 3.0 | 3.0 | 3.0 | 3.0 | 3.8 | 4.3 | 3.0 |
| | | Flight distance on driver shots (yd) | 0.0 | 0.2 | 1.1 | 1.2 | 1.4 | 1.8 | 0.0 | −0.4 | Standard (0.0) |
| | | Shot feeling on driver shots | F | G | E | E | E | E | F | F | F |

*1) An appropriate amount of barium sulfate was added such that the obtained golf ball had a mass of 45.3 g.

TABLE 6

| | | Golf ball No. | 45 | 46 | 47 | 48 | 49 | 50 | 51 | 52 | 53 |
|---|---|---|---|---|---|---|---|---|---|---|---|
| Core rubber composition | Formulation (parts by mass) | (a) BR730 | 100 | 100 | 100 | 100 | 100 | 100 | 100 | 100 | 100 |
| | | (b) ZN-DA90S | 27 | 29 | 35 | 36 | 38 | 37 | 55 | 55 | 27 |
| | | (c) Dicumyl peroxide | 0.8 | 0.8 | 0.8 | 0.8 | 0.8 | 0.8 | 0.8 | 0.8 | 0.8 |
| | | (f) Zinc oxide | 5.0 | 5.0 | 5.0 | 5.0 | 5.0 | 5.0 | 5.0 | 5.0 | 5.0 |
| | | (e) PBDS | 1.0 | 1.0 | 1.0 | 1.0 | 1.0 | 1.0 | 1.0 | 1.0 | 1.0 |
| | | (e) PCTP-Zn | — | — | — | — | — | — | — | — | — |
| | | (e) NOCCELER M-P | — | — | — | — | — | — | — | — | — |
| | | (d) 4-Propoxyphenol | 0.05 | 0.10 | 0.25 | 0.50 | 1.00 | 2.00 | 3.00 | 5.00 | — |
| | | Barium sulfate | *1) | *1) | *1) | *1) | *1) | *1) | *1) | *1) | *1) |
| Core | | Compression deformation amount SCH (mm) | 3.3 | 3.3 | 3.3 | 3.3 | 3.3 | 3.3 | 4.0 | 4.5 | 3.3 |
| | | Center hardness H0 | 63 | 66 | 65 | 64 | 61 | 65 | 65 | 62 | 63 |
| | | Hardness H12.5 at 12.5% point | 68 | 71 | 71 | 70 | 67 | 68 | 65 | 62 | 68 |
| | | Hardness H25 at 25% point | 71 | 73 | 73 | 72 | 72 | 71 | 65 | 62 | 71 |
| | | Hardness H37.5 at 37.5% point | 73 | 75 | 75 | 75 | 76 | 76 | 63 | 60 | 73 |
| | | Hardness H50 at 50% point | 73 | 78 | 77 | 77 | 76 | 74 | 61 | 58 | 73 |
| | | Hardness H62.5 at 62.5% point | 73 | 76 | 76 | 76 | 75 | 73 | 59 | 56 | 73 |
| | | Hardness H75 at 75% point | 76 | 74 | 74 | 73 | 73 | 73 | 59 | 56 | 76 |
| | | Surface hardness Hs | 86 | 75 | 75 | 76 | 77 | 76 | 60 | 57 | 86 |
| | | Surface hardness Hs-Center hardness H0 | 23 | 9 | 10 | 12 | 16 | 11 | −5 | −5 | 23 |
| | | Surface hardness Hs-Hardness H50 at 50% point | 13 | −3 | −2 | −1 | 1 | 2 | −1 | −1 | 13 |
| | | Surface hardness Hs-Hardness H75 at 75% point | 10 | 1 | 1 | 3 | 4 | 3 | 1 | 1 | 10 |
| | | (Hs-H0)/SCH | 7.0 | 2.9 | 3.0 | 3.6 | 4.8 | 3.3 | −1.3 | −1.1 | 7.0 |
| Golf ball | | Compression deformation amount SCH (mm) | 3.0 | 3.0 | 3.0 | 3.0 | 3.0 | 3.0 | 3.8 | 4.3 | 3.0 |
| | | Flight distance on driver shots (yd) | 0.0 | 0.2 | 1.1 | 1.2 | 1.4 | 1.8 | 0.0 | −0.4 | Standard (0.0) |
| | | Shot feeling on driver shots | F | G | E | E | E | E | F | F | F |

*1) An appropriate amount of barium sulfate was added such that the obtained golf ball had a mass of 45.3 g.

TABLE 7

| | | Golf ball No. | 54 | 55 | 56 | 57 | 58 | 59 | 60 | 61 | 62 |
|---|---|---|---|---|---|---|---|---|---|---|---|
| Core rubber composition | Formulation (parts by mass) | (a) BR730 | 100 | 100 | 100 | 100 | 100 | 100 | 100 | 100 | 100 |
| | | (b) ZN-DA90S | 27 | 29 | 35 | 36 | 38 | 37 | 55 | 55 | 27 |
| | | (c) Dicumyl peroxide | 0.8 | 0.8 | 0.8 | 0.8 | 0.8 | 0.8 | 0.8 | 0.8 | 0.8 |
| | | (f) Zinc oxide | 5.0 | 5.0 | 5.0 | 5.0 | 5.0 | 5.0 | 5.0 | 5.0 | 5.0 |
| | | (e) PBDS | — | — | — | — | — | — | — | — | — |
| | | (e) PCTP-Zn | 1.0 | 1.0 | 1.0 | 1.0 | 1.0 | 1.0 | 1.0 | 1.0 | 1.0 |
| | | (e) NOCCELER M-P | — | — | — | — | — | — | — | — | — |
| | | (d) 4-Propoxyphenol | 0.05 | 0.10 | 0.25 | 0.50 | 1.00 | 2.00 | 3.00 | 5.00 | — |
| | | Barium sulfate | *1) | *1) | *1) | *1) | *1) | *1) | *1) | *1) | *1) |
| Core | | Compression deformation amount SCH (mm) | 3.3 | 3.3 | 3.3 | 3.3 | 3.3 | 3.3 | 4.0 | 4.5 | 3.3 |
| | | Center hardness H0 | 63 | 66 | 65 | 64 | 61 | 65 | 65 | 62 | 63 |
| | | Hardness H12.5 at 12.5% point | 68 | 71 | 71 | 70 | 67 | 68 | 65 | 62 | 68 |
| | | Hardness H25 at 25% point | 71 | 73 | 73 | 72 | 72 | 71 | 65 | 62 | 71 |
| | | Hardness H37.5 at 37.5% point | 73 | 75 | 75 | 75 | 76 | 76 | 63 | 60 | 73 |
| | | Hardness H50 at 50% point | 73 | 78 | 77 | 77 | 76 | 74 | 61 | 58 | 73 |
| | | Hardness H62.5 at 62.5% point | 73 | 76 | 76 | 76 | 75 | 73 | 59 | 56 | 73 |
| | | Hardness H75 at 75% point | 76 | 74 | 74 | 73 | 73 | 73 | 59 | 56 | 76 |
| | | Surface hardness Hs | 86 | 75 | 75 | 76 | 77 | 76 | 60 | 57 | 86 |
| | | Surface hardness Hs-Center hardness H0 | 23 | 9 | 10 | 12 | 16 | 11 | −5 | −5 | 23 |
| | | Surface hardness Hs-Hardness H50 at 50% point | 13 | −3 | −2 | −1 | 1 | 2 | −1 | −1 | 13 |
| | | Surface hardness Hs-Hardness H75 at 75% point | 10 | 1 | 1 | 3 | 4 | 3 | 1 | 1 | 10 |
| | | (Hs-H0)/SCH | 7.0 | 2.9 | 3.0 | 3.6 | 4.8 | 3.3 | −1.3 | −1.1 | 7.0 |
| Golf ball | | Compression deformation amount SCH (mm) | 3.0 | 3.0 | 3.0 | 3.0 | 3.0 | 3.0 | 3.8 | 4.3 | 3.0 |
| | | Flight distance on driver shots (yd) | 0.0 | 0.2 | 1.1 | 1.2 | 1.4 | 1.8 | 0.0 | −0.4 | Standard (0.0) |
| | | Shot feeling on driver shots | F | G | E | E | E | E | F | F | F |

*1) An appropriate amount of barium sulfate was added such that the obtained golf ball had a mass of 45.3 g.

TABLE 8

| | | Golf ball No. | 63 | 64 | 65 | 66 | 67 | 68 | 69 | 70 | 71 |
|---|---|---|---|---|---|---|---|---|---|---|---|
| Core rubber composition | Formulation (parts by mass) | (a) BR730 | 100 | 100 | 100 | 100 | 100 | 100 | 100 | 100 | 100 |
| | | (b) ZN-DA90S | 27 | 29 | 35 | 36 | 38 | 37 | 55 | 55 | 27 |
| | | (c) Dicumyl peroxide | 0.8 | 0.8 | 0.8 | 0.8 | 0.8 | 0.8 | 0.8 | 0.8 | 0.8 |
| | | (f) Zinc oxide | 5.0 | 5.0 | 5.0 | 5.0 | 5.0 | 5.0 | 5.0 | 5.0 | 5.0 |
| | | (e) PBDS | 1.0 | 1.0 | 1.0 | 1.0 | 1.0 | 1.0 | 1.0 | 1.0 | 1.0 |
| | | (e) PCTP-Zn | — | — | — | — | — | — | — | — | — |
| | | (e) NOCCELER M-P | — | — | — | — | — | — | — | — | — |
| | | (d) 4-Butoxyphenol | 0.05 | 0.10 | 0.25 | 0.50 | 1.00 | 2.00 | 3.00 | 5.00 | — |
| | | Barium sulfate | *1) | *1) | *1) | *1) | *1) | *1) | *1) | *1) | *1) |
| Core | | Compression deformation amount SCH (mm) | 3.3 | 3.3 | 3.3 | 3.3 | 3.3 | 3.3 | 4.0 | 4.5 | 3.3 |
| | | Center hardness H0 | 63 | 61 | 61 | 63 | 66 | 71 | 65 | 62 | 63 |
| | | Hardness H12.5 at 12.5% point | 68 | 68 | 68 | 69 | 71 | 72 | 65 | 62 | 68 |
| | | Hardness H25 at 25% point | 71 | 72 | 72 | 73 | 75 | 75 | 65 | 62 | 71 |
| | | Hardness H37.5 at 37.5% point | 73 | 72 | 73 | 74 | 77 | 77 | 63 | 60 | 73 |
| | | Hardness H50 at 50% point | 73 | 74 | 75 | 75 | 76 | 76 | 61 | 58 | 73 |
| | | Hardness H62.5 at 62.5% point | 73 | 77 | 77 | 76 | 75 | 73 | 59 | 56 | 73 |
| | | Hardness H75 at 75% point | 76 | 76 | 75 | 74 | 72 | 69 | 59 | 56 | 76 |
| | | Surface hardness Hs | 86 | 78 | 77 | 77 | 75 | 72 | 60 | 57 | 86 |
| | | Surface hardness Hs-Center hardness H0 | 23 | 17 | 16 | 14 | 9 | 1 | −5 | −5 | 23 |
| | | Surface hardness Hs-Hardness H50 at 50% point | 13 | 4 | 2 | 2 | −1 | −4 | −1 | −1 | 13 |
| | | Surface hardness Hs-Hardness H75 at 75% point | 10 | 2 | 2 | 3 | 3 | 3 | 1 | 1 | 10 |
| | | (Hs-H0)/SCH | 7.0 | 5.2 | 4.8 | 4.2 | 2.7 | 0.3 | −1.3 | −1.1 | 7.0 |
| Golf ball | | Compression deformation amount SCH (mm) | 3.0 | 3.0 | 3.0 | 3.0 | 3.0 | 3.0 | 3.8 | 4.3 | 3.0 |
| | | Flight distance on driver shots (yd) | 0.0 | 0.2 | 0.7 | 1.2 | 1.7 | 2.1 | 0.0 | −0.4 | Standard (0.0) |
| | | Shot feeling on driver shots | F | G | E | E | E | E | F | F | F |

*1) An appropriate amount of barium sulfate was added such that the obtained golf ball had a mass of 45.3 g.

TABLE 9

| Golf ball No. | | | 72 | 73 | 74 | 75 | 76 | 77 | 78 | 79 | 80 |
|---|---|---|---|---|---|---|---|---|---|---|---|
| Core rubber composition | Formulation (parts by mass) | (a) BR730 | 100 | 100 | 100 | 100 | 100 | 100 | 100 | 100 | 100 |
| | | (b) ZN-DA90S | 27 | 29 | 35 | 36 | 38 | 37 | 55 | 55 | 27 |
| | | (c) Dicumyl peroxide | 0.8 | 0.8 | 0.8 | 0.8 | 0.8 | 0.8 | 0.8 | 0.8 | 0.8 |
| | | (f) Zinc oxide | 5.0 | 5.0 | 5.0 | 5.0 | 5.0 | 5.0 | 5.0 | 5.0 | 5.0 |
| | | (e) PBDS | — | — | — | — | — | — | — | — | — |
| | | (e) PCTP-Zn | 1.0 | 1.0 | 1.0 | 1.0 | 1.0 | 1.0 | 1.0 | 1.0 | 1.0 |
| | | (e) NOCCELER M-P | — | — | — | — | — | — | — | — | — |
| | | (d) 4-Butoxyphenol | 0.05 | 0.10 | 0.25 | 0.50 | 1.00 | 2.00 | 3.00 | 5.00 | — |
| | | Barium sulfate | *1) | *1) | *1) | *1) | *1) | *1) | *1) | *1) | *1) |
| Core | | Compression deformation amount SCH (mm) | 3.3 | 3.3 | 3.3 | 3.3 | 3.3 | 3.3 | 4.0 | 4.5 | 3.3 |
| | | Center hardness H0 | 63 | 61 | 61 | 63 | 66 | 71 | 65 | 62 | 63 |
| | | Hardness H12.5 at 12.5% point | 68 | 68 | 68 | 69 | 71 | 72 | 65 | 62 | 68 |
| | | Hardness H25 at 25% point | 71 | 72 | 72 | 73 | 75 | 75 | 65 | 62 | 71 |
| | | Hardness H37.5 at 37.5% point | 73 | 72 | 73 | 74 | 77 | 77 | 63 | 60 | 73 |
| | | Hardness H50 at 50% point | 73 | 74 | 75 | 75 | 76 | 76 | 61 | 58 | 73 |
| | | Hardness H62.5 at 62.5% point | 73 | 77 | 77 | 76 | 75 | 73 | 59 | 56 | 73 |
| | | Hardness H75 at 75% point | 76 | 76 | 75 | 74 | 72 | 69 | 59 | 56 | 76 |
| | | Surface hardness Hs | 86 | 78 | 77 | 77 | 75 | 72 | 60 | 57 | 86 |
| | | Surface hardness Hs-Center hardness H0 | 23 | 17 | 16 | 14 | 9 | 1 | −5 | −5 | 23 |
| | | Surface hardness Hs-Hardness H50 at 50% point | 13 | 4 | 2 | 2 | −1 | −4 | −1 | −1 | 13 |
| | | Surface hardness Hs-Hardness H75 at 75% point | 10 | 2 | 2 | 3 | 3 | 3 | 1 | 1 | 10 |
| | | (Hs-H0)/SCH | 7.0 | 5.2 | 4.8 | 4.2 | 2.7 | 0.3 | −1.3 | −1.1 | 7.0 |
| Golf ball | | Compression deformation amount SCH (mm) | 3.0 | 3.0 | 3.0 | 3.0 | 3.0 | 3.0 | 3.8 | 4.3 | 3.0 |
| | | Flight distance on driver shots (yd) | 0.0 | 0.2 | 0.7 | 1.2 | 1.7 | 2.1 | 0.0 | −0.4 | Standard (0.0) |
| | | Shot feeling on driver shots | F | G | E | E | E | E | F | F | F |

*1) An appropriate amount of barium sulfate was added such that the obtained golf ball had a mass of 45.3 g.

The materials used in Table 1 to Table 9 are shown below.

BR730: high-cis polybutadiene rubber (amount of cis-1,4 bond=95 mass %, amount of 1,2-vinyl bond=1.3 mass %, Moony viscosity ($ML_{1+4}$ (100° C.)=55, molecular weight distribution (Mw/Mn)=3) available from JSR Corporation ZN-DA90S: zinc acrylate (containing zinc stearate in an amount of 10%) available from Nisshoku Techno Fine Chemical Co., Ltd.

Dicumyl peroxide: available from Tokyo Chemical Industry Co., Ltd.

Zinc oxide: "Ginrei R" available from Toho Zinc Co., Ltd.

Barium sulfate: "Barium Sulfate BD" available from Sakai Chemical Industry Co., Ltd.

PBDS: bis(pentabromophenyl) disulfide available from Kawaguchi Chemical Industry Co., Ltd.

PCTP-Zn: zinc salt of pentachlorothiophenol available from Tokyo Chemical Industry Co., Ltd.

NOCCELER M-P: 2-mercaptobenzothiazole available from Ouchi Shinko Chemical Industrial Co., Ltd.

4-Methoxyphenol: available from Tokyo Chemical Industry Co., Ltd.

4-Ethoxyphenol: available from Tokyo Chemical Industry Co., Ltd.

4-Propoxyphenol: available from Tokyo Chemical Industry Co., Ltd.

4-Butoxyphenol: available from Tokyo Chemical Industry Co., Ltd.

(2) Production of Cover and Production of Golf Ball

According to the formulation shown in Table 10, the cover materials were extruded with a twin-screw kneading extruder to prepare the cover composition in a pellet form. The extruding conditions of the cover composition were a screw diameter of 45 mm, a screw rotational speed of 200 rpm, and screw L/D=35, and the mixture was heated to 160 to 230° C. at the die position of the extruder. The obtained cover composition was injection molded on the spherical core obtained above such that the cover had a thickness of 1.5 mm, to obtain golf balls having the spherical core and the cover covering the core. The evaluation results of the obtained golf balls are shown in Table 1 to Table 9.

TABLE 10

| Cover composition | Formulation (parts by mass) |
|---|---|
| Himilan 1555 | 40 |
| Himilan 1605 | 20 |
| Himilan AM7329 | 40 |
| A220 | 3 |
| JF-90 | 0.2 |
| hardness (Shore D) | 63 |

The materials used in Table 10 are shown below.

Himilan 1555: a sodium ion neutralized ionomer available from Du Pont-Mitsui Polychemicals Co., Ltd.

Himilan 1605: a sodium ion neutralized ionomer available from Du Pont-Mitsui Polychemicals Co., Ltd.

Himilan AM7329: a zinc ion neutralized ionomer available from Du Pont-Mitsui Polychemicals Co., Ltd.

A-220: titanium dioxide available from Ishihara Sangyo Kaisha, Ltd.

JF-90: light stabilizer available from Johoku chemical Co., Ltd.

As shown in Table 1 to Table 9, the golf ball according to the present invention travels a great flight distance and has excellent shot feeling on driver shots.

The present invention is suitably applicable for a golf ball.

This application is based on Japanese patent application No. 2020-212988, filed on Dec. 22, 2020, the contents of which are hereby incorporated by reference.

The invention claimed is:

1. A golf ball comprising a core and at least one cover layer covering the core, wherein the core is formed from a core rubber composition containing (a) a base rubber, (b) an α,β-unsaturated carboxylic acid having 3 to 8 carbon atoms and/or a metal salt thereof as a co-crosslinking agent, (c) a crosslinking initiator, and (d) a monophenol compound having a substituent group only at p-position.

2. The golf ball according to claim 1, wherein the core rubber composition contains (d) the monophenol compound having the substituent group only at the p-position in an amount ranging from 0.1 part by mass to 2.0 parts by mass with respect to 100 parts by mass of (a) the base rubber.

3. The golf ball according to claim 1, wherein (d) the monophenol compound having the substituent group only at the p-position is a compound represented by the following general formula (1):

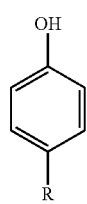

(1)

in the general formula (1), R represents an alkoxy group, a halogen group, a hydrocarbon group, a nitro group, a cyano group, an amino group, or a hydroxy group.

4. The golf ball according to claim 1, wherein the core rubber composition further contains (e) an organic sulfur compound.

5. The golf ball according to claim 4, wherein (e) the organic sulfur compound is at least one member selected from the group consisting of thiophenols substituted with a halogen group, a metal salt of thiophenols substituted with a halogen group, diphenyldisulfides substituted with a halogen group, thiazoles, and a metal salt of thiazoles.

6. The golf ball according to claim 1, wherein a hardness difference (Hs−H0) between a surface hardness (Hs) of the core and a center hardness (H0) of the core is 25 or less in Shore C hardness.

7. The golf ball according to claim 1, wherein a hardness difference (Hs−H50) between a surface hardness (Hs) of the core and a hardness (H50) at 50% point of a core radius from a central point of the core is −10 or more and 12 or less in Shore C hardness.

8. The golf ball according to claim 1, wherein a surface hardness (Hs) of the core ranges from 60 to 95 in Shore C hardness.

9. The golf ball according to claim 1, wherein a center hardness (H0) of the core ranges from 40 to 80 in Shore C hardness.

10. The golf ball according to claim 1, wherein a hardness (H50) at 50% point of a core radius from a central point of the core ranges from 65 to 85 in Shore C hardness.

11. The golf ball according to claim 1, wherein a hardness difference (Hs−H75) between a surface hardness (Hs) of the core and a hardness (H75) at 75% point of a core radius from a central point of the core is −10 or more and 15 or less in Shore C hardness.

12. The golf ball according to claim 1, wherein a ratio ((Hs−H0)/SCH) of a hardness difference (Hs−Ho) between a surface hardness (Hs) of the core and a center hardness (H0) of the core to a compression deformation amount (SCH) of the core when applying a load from an initial load of 98 N to a final load of 1275 N to the core ranges from −5.0 to 7.0.

13. The golf ball according to claim 3, wherein R represents an alkoxy group having 1 to 8 carbon atoms.

14. The golf ball according to claim 1, wherein a mass ratio (component (b)/component (d)) of the component (b) to the component (d) ranges from 18.5 to 300.

15. The golf ball according to claim 1, wherein a mass ratio (component (c)/component (d)) of the component (c) to the component (d) ranges from 0.4 to 10.0.

16. The golf ball according to claim 1, wherein (d) the monophenol compound having the substituent group only at the p-position includes at least one member selected from the group consisting of 4-methoxyphenol, 4-ethoxyphenol, 4-propoxyphenol and 4-butoxyphenol.

17. The golf ball according to claim 1, wherein the cover is formed from a cover composition containing an ionomer resin as a resin component, and an amount of the ionomer resin in the resin component of the cover composition is more than 50 mass %.

18. The golf ball according to claim 1, wherein a mass ratio (component (c)/component (d)) of the component (c) to the component (d) is 0.4 or more and less than 5.0.

19. A golf ball comprising a core and at least one cover layer covering the core, wherein the core is formed from a core rubber composition containing (a) a base rubber, (b) an α,β-unsaturated carboxylic acid having 3 to 8 carbon atoms and/or a metal salt thereof as a co-crosslinking agent, (c) a crosslinking initiator, (d) a monophenol compound having a substituent group only at p-position, and (e) an organic sulfur compound, wherein (d) the monophenol compound having the substituent group only at the p-position includes at least one member selected from the group consisting of 4-methoxyphenol, 4-ethoxyphenol, 4-propoxyphenol and 4-butoxyphenol, (e) the organic sulfur compound is at least one member selected from the group consisting of thiophenols substituted with a halogen group, a metal salt of thiophenols substituted with a halogen group, diphenyldisulfides substituted with a halogen group, thiazoles, and a metal salt of thiazoles, and a ratio ((Hs−H0)/SCH) of a hardness difference (Hs−H0) between a surface hardness (Hs) of the core and a center hardness (H0) of the core to a compression deformation amount (SCH) of the core when applying a load from an initial load of 98 N to a final load of 1275 N to the core ranges from −5.0 to 7.0.

* * * * *